United States Patent
US 11,032,968 B2
Kraus
Jun. 15, 2021

(54) DEVICE FOR DELIVERING PLANT SEEDS

(71) Applicant: Blue Marble Scientific, LLC, Mendota Heights, MN (US)

(72) Inventor: Thomas G. Kraus, Mendota Heights, MN (US)

(73) Assignee: Blue Marble Scientific, LLC, Mendota Heights, MN (US)

( * ) Notice: Subject to any disclaimer, the term of this patent is extended or adjusted under 35 U.S.C. 154(b) by 328 days.

(21) Appl. No.: 15/088,279

(22) Filed: Apr. 1, 2016

(65) Prior Publication Data

US 2016/0286715 A1 Oct. 6, 2016

Related U.S. Application Data

(60) Provisional application No. 62/141,324, filed on Apr. 1, 2015.

(51) Int. Cl.
| | | |
|---|---|---|
| *A01C 1/06* | (2006.01) | |
| *A01C 14/00* | (2006.01) | |
| *A01G 9/029* | (2018.01) | |

(52) U.S. Cl.
CPC ............ *A01C 14/00* (2013.01); *A01G 9/0293* (2018.02); *A01C 1/06* (2013.01)

(58) Field of Classification Search
CPC ....................................................... A01C 1/06
USPC ...................................... 47/56, 57.6, 58.1 SE
See application file for complete search history.

(56) References Cited

U.S. PATENT DOCUMENTS

| | | | |
|---|---|---|---|
| 2,984,940 A | | 5/1961 | Vincent |
| 3,555,730 A | | 1/1971 | Brink |
| 3,734,987 A | | 5/1973 | Hamrin |
| 4,769,945 A | | 9/1988 | Motoyama et al. |
| 4,777,762 A | * | 10/1988 | Redenbaugh ............ A01H 4/00 47/57.6 |
| 4,779,376 A | | 10/1988 | Redenbaugh |
| 4,780,987 A | | 11/1988 | Nelsen et al. |
| 4,808,430 A | | 2/1989 | Kouno |
| 4,849,005 A | * | 7/1989 | Williams ................ C05F 11/08 71/7 |
| 5,236,469 A | * | 8/1993 | Carlson .................. A01H 4/006 435/410 |
| 5,250,082 A | * | 10/1993 | Teng ...................... A01H 4/006 47/57.6 |
| 5,701,699 A | | 12/1997 | Carlson et al. |
| 5,737,872 A | | 4/1998 | Cunningham et al. |

(Continued)

FOREIGN PATENT DOCUMENTS

| | | |
|---|---|---|
| CA | 2000620 | 4/1999 |
| CA | 2571556 A1 | 1/2006 |

(Continued)

*Primary Examiner* — David J Parsley
(74) *Attorney, Agent, or Firm* — Patterson Thuente Pedersen, P.A.

(57) ABSTRACT

A seed delivery device that includes an enclosed container inside which is encapsulated one or more plant seeds and a medium. The medium may comprise one or more particulate materials, one or more aqueous materials, or a combination of one or more particulate materials and aqueous materials. The specific gravity of the entire device is greater than the specific gravity of water. The seed delivery devices may be used to address the planting of seeds in conditions where water is or may become present.

19 Claims, 5 Drawing Sheets

(56) References Cited

U.S. PATENT DOCUMENTS

| | | | |
|---|---|---|---|
| 6,119,395 A * | 9/2000 | Hartle | A01H 4/006 47/57.6 |
| 6,516,565 B1 * | 2/2003 | Fima | A01C 7/085 47/74 |
| 6,558,081 B2 | 5/2003 | Hull | |
| 6,973,752 B2 | 12/2005 | Anderson | |
| 6,982,095 B2 | 1/2006 | Asada et al. | |
| 7,472,661 B2 * | 1/2009 | Hull | A01C 1/06 111/200 |
| 8,458,955 B2 | 6/2013 | Larsen | |
| 8,683,742 B1 | 4/2014 | Cox | |
| 2005/0284351 A1 | 12/2005 | Hull | |
| 2006/0230999 A1 | 10/2006 | Long | |
| 2010/0263274 A1 * | 10/2010 | Corak | A01C 1/06 47/57.6 |
| 2010/0267554 A1 | 10/2010 | Madsen et al. | |
| 2011/0239535 A1 | 10/2011 | Conrad | |
| 2011/0275520 A1 | 11/2011 | Frey et al. | |
| 2012/0186147 A1 | 7/2012 | Crivello | |
| 2013/0180173 A1 | 7/2013 | Caspar et al. | |
| 2014/0208648 A1 | 7/2014 | Cox | |

FOREIGN PATENT DOCUMENTS

| | | |
|---|---|---|
| EP | 0 141 374 A2 | 5/1985 |
| EP | 0 543 438 A1 | 5/1993 |
| WO | WO 87/01258 | 3/1987 |
| WO | WO 2010/111309 A1 | 9/2010 |
| WO | WO 2011/123602 A1 | 10/2011 |

\* cited by examiner

DEVICE FOR DELIVERING PLANT SEEDS

CROSS REFERENCE TO RELATED APPLICATION

This application claims priority to U.S. Provisional Patent Application No. 62/141,324 filed Apr. 1, 2015, the disclosure of which is herein incorporated by reference in its entirety.

TECHNICAL FIELD OF THE DISCLOSURE

The present invention relates generally to the delivery of plant seeds to a substrate, and in particular to the delivery of plant seeds to substrates that are or may become saturated, inundated, or submerged. The seed delivery is accomplished through the use of a device having a small dissolvable container within which is contained a medium and one or more plant seeds, as further described.

BACKGROUND

The role that native wetland plants play in improving the water quality of oceans, lakes, rivers, and streams has been a subject of intense research over the past thirty or more years. Wetlands serve as "nature's kidneys," filtering pollutants that run off from surrounding surfaces before allowing water to return to nearby surface and ground water. Creating new wetlands that serve this crucial function, and restoring existing wetlands by increasing the diversity of species of native wetland plants, has in many cases become a regulatory-driven requirement when developing land in a way that negatively impacts existing wetlands. Native wetland plants are also often used for shoreline stabilization, to create pollution-decreasing buffer zones along shorelines, and simply to increase the natural beauty and biological diversity of these environments.

Nature creates wetland environments through a variety of processes (e.g. wind, waves, rain, periods of dryness, winter thaws, etc.) that distribute seeds across an area that may be alternately saturated, inundated, or submerged. These processes may take many decades, to produce a functioning wetland that is rich in plant diversity. When creating or restoring wetlands, however, such a time scale is unacceptable in many cases. Consequently, artificial means of propagating wetland plants are often pursued to accelerate this natural process.

The physical characteristics of seeds derived from many native plant species, particularly the seeds of native wetland plant species, can make the on-site propagation of native plants in a wetland environment quite challenging. The size, shape, weight, and buoyancy of native seeds (among other characteristics) often make them difficult to handle and distribute in a predictable manner.

Scattering seed through the air, whether by hand or using a mechanical device, can be problematic for a variety of reasons. Seeds may stick to machinery or the sower's hands due to static or moisture. Application rates can be very difficult to control, especially for seeds that are very small and light. Control over the physical placement of seeds can be difficult because of wind, water, and other factors. And seeds, which may be lightweight and often float, may not remain where they are sown due to wind and water, or may be tampered with or consumed by animals.

Mechanical devices, such as drilling or planting implements that precisely place seeds in the ground and then cover them with soil, can be useful in many terrestrial environments (e.g. in an upland prairie setting) but are often not viable options for sowing seeds in saturated or aquatic environments, or with seeds that are particularly small. Further, these heavy pieces of equipment can be damaging in environments where desirable plant species already exist.

Liquid sprayers are used at times to distribute seeds, with some effectiveness. These are often used with water and seed mixed with organic material (e.g. peat, wood/plant fiber, etc.) to create a "slurry" of liquid material that acts as a carrier for seeds. However, reliable distribution of seed material presents a challenge using this method, and distribution of seeds through a water column is ineffective, as seeds typically float away from the targeted substrate.

Sometimes seeds are incorporated into fibrous mats or blankets made of biodegradable materials. These mats can then be spread to cover the targeted substrate. However, such methods are costly on a large scale, and also cannot be effectively used in applications where standing water is present.

Finally, the direct planting of live plants is another method used to establish native plant species in a wetland environment. This approach involves the use of live plants, e.g. bare roots, plugs, or potted plants that are first propagated in a controlled environment, such as a greenhouse, and then transported and transplanted on site. While this method may be effective, it is costly, labor intensive, logistically challenging, and difficult to complete on a large scale. Animal herbivory of the live plants also represents a serious concern using this approach.

SUMMARY

This disclosure is directed to an article of manufacture and a method for the manufacturing and delivery of plant seeds. The article of manufacture is a seed delivery device that includes an enclosed container inside which is encapsulated one or more plant seeds and a medium. The medium may comprise one or more particulate materials, one or more aqueous materials, or a combination of one or more particulate materials and aqueous materials. The specific gravity of the entire device is greater than the specific gravity of water. It is generally recognized that the specific gravity for salt water or brackish water is slightly greater than 1. For purposes of this disclosure, the seed delivery device sinks in water, whether fresh, salt (saline), or brackish.

When the device is distributed to a target substrate and comes into contact with sufficient moisture, the container gradually dissolves or disassociates. In the process of dissolving, the medium within the container is also exposed to moisture, causing the plant seeds to become secured to the medium, and the medium to become secured to the substrate upon which the device has been resting. The plant seeds remain secured to the medium and the medium remains secured to the substrate long enough for germination of the plant seeds to occur. The medium is selected so that it does not adversely affect the germination of the plant seeds. In some embodiments, the roots of the plant grow through the medium into the substrate such that the plant is "implanted" into the substrate.

This disclosure also contemplates a method of delivering the seed delivery device.

Various embodiments utilize either manual or mechanical approaches to delivering a plurality of seed delivery devices to a selected substrate or environment.

The following terms used in this application are defined as follows:

"Aqueous material" means the liquid phase of a compound or component.

"Container" means an encapsulating enclosure capable of surrounding or shielding its internal contents from external variants or forces.

"Medium" means particulate material or aqueous material included in the seed delivery device.

"Particulate materials" means the solid phase of a compound, component or element which may be present in various sizes or shapes.

"Plant Seed" means any propagule, including but not limited to a seed, a spore, a bud, a root, a shoot, a cutting, or any vegetative structure that can give rise to a new plant.

"Polymer" independently means; homopolymers, copolymers, terpolymers, block copolymers, segmented copolymers, graft copolymers, and any mixture or combination thereof.

"Secure" or "Securing" means holding in place, affixing, attaching, adhering, positioning, sticking, immobilizing or integrating one material to, or onto, another material.

"Seed delivery device" means a container possessing one or more plant seeds in a medium as set forth in this disclosure.

The above summary of the present invention is not intended to describe each disclosed embodiment or every implementation of the present invention. The detailed description that follows more particularly exemplifies illustrative embodiments.

DETAILED DESCRIPTION

Figure 1:
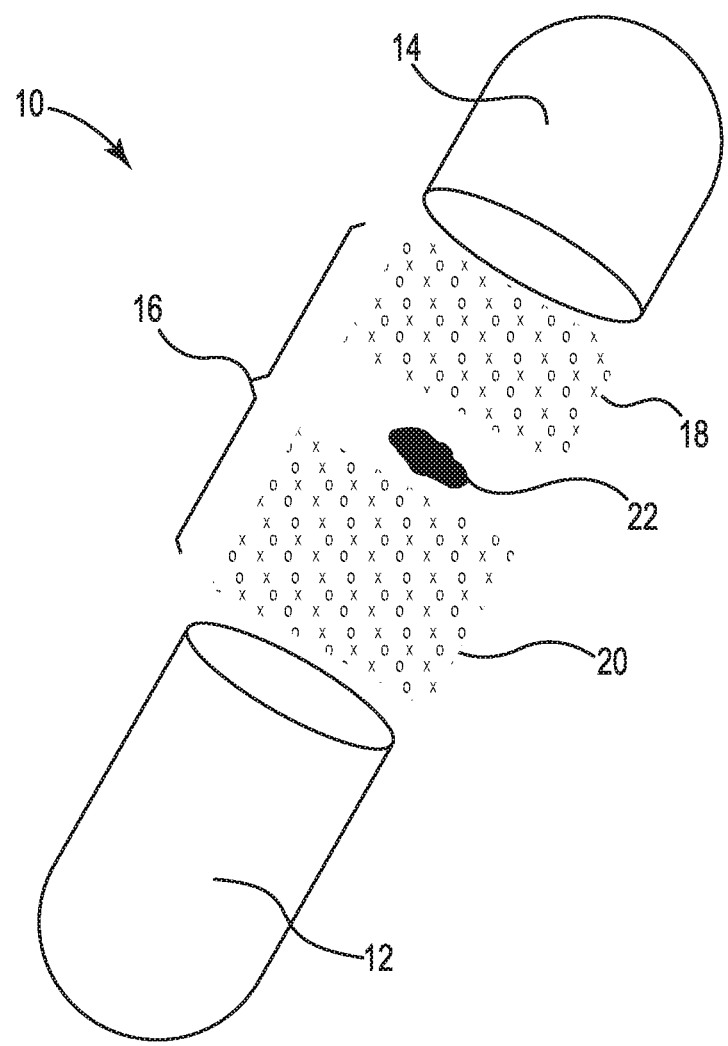
FIG. 1 is an illustration of an embodiment of a seed delivery device of this disclosure in an exploded view.
Figure 2:
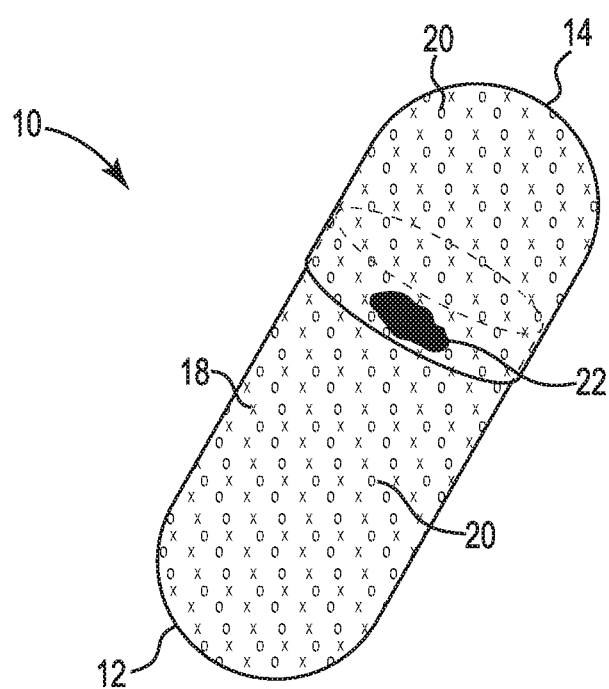
FIG. 2 is an illustration of one embodiment of the seed delivery device of this disclosure.

FIGS. 1 and 2 depict one embodiment of the seed delivery device 10. FIG. 1 shows the device disassembled into its component parts, while FIG. 2 shows the same device fully assembled. In this embodiment, the seed delivery device 10 is a two-piece container 12, 14, with a smaller diameter body 12 and a larger diameter cap 14 that when placed over the lower body seals its contents. In this non-limiting example, the medium 16 is a mixture of two particulate materials 18, 20, clay particles ("X") and polymer particles ("O") and a plant seed 22. For this particular embodiment, the smaller diameter body 12 is filled with medium 16, and at least one plant seed 22 is placed on top of the medium. Additional medium 16 occupies the volume within the larger diameter cap 14 and covers the plant seed 22, so that when the capsule 12, 14 is assembled the plant seed 22 is at least partially surrounded by medium 16.

In some embodiments, the container is a capsule similar in structure to those used in the pharmaceutical industry for the delivery of medication. Various types of capsules may be used in different embodiments of the device. Currently such capsules are most commonly made from aqueous solutions of gelling agents, though other materials may conceivably be used. Capsules may be hard-shelled and made in two halves, with a lower diameter body that typically contains dry powdered ingredients, pellets, or granules, and a higher diameter "cap" that seals the contents of the body.

Alternatively, soft-shelled capsules may be employed comprising a single-piece encapsulation that typically holds contents that are moist or liquid. Current aqueous solutions of gelling agents used to produce capsules are of two types, animal protein capsules, mainly gelatin, and plant polysaccharides or their derivatives like carrageenan and modified forms of starch and cellulose. Ingredients can be added to the gelling agent solution to affect hardness, color, shelf life, solubility, lubrication, and surface treatment (e.g. the surface of the capsule can be printed upon for identification purposes). Standard hard-shelled capsules come in a range of sizes, the smallest (Size 5) with a volume of 0.13 ml, a locked length of 11.1 mm, and an external diameter of 4.91 mm, and the largest (Size Su07) with a volume of 28 ml, a locked length of 88.5 mm, and an external diameter of 23.4 mm. Capsules could also be manufactured in custom sizes.

In other embodiments of the device, the container is a sealed pod, similar in appearance to those used to contain laundry or dish washing detergent. The pods may be made of polyvinyl alcohol (PVA/PVOH) or other similar dissolvable materials. The pods may be made by pressing two sheets of dissolvable material around the medium and plant seeds and fusing them using heat, pressure, a chemical reaction, or other methods to form a sealed pod. The container may also be a pouch that is formed of a dissolvable material that is shaped like a small plastic bag that is filled with plant seeds and medium and then sealed to enclose the bag into a pouch.

This disclosure contemplates the addition of components or compounds that protect the seed delivery device or employ mechanisms to ensure it remains on an intended substrate. In certain embodiments, agents that are intended to discourage herbivory or tampering with the device may be incorporated into the container. Such agents may include animal urine or similar scents, or agents that have a bitter or otherwise undesirable taste such as methyl anthranilate, a derivative of Concord grapes that is known to be effective at deterring birds. These agents may be incorporated within the container itself, or the container may be coated with the agents. Agents may be applied in liquid, solid, or gaseous forms.

For purposes of this disclosure, a seed is an embryonic plant enclosed in a protective outer covering called the seed coat. However, the term plant seed is meant to include any propagule, including but not limited to a seed, a spore, a bud, a root, a shoot, a cutting, or any vegetative structure that can give rise to a new plant.

Various embodiments of the invention include seeds derived from native plant species, though seeds of non-native or genetically modified plant species may also be used. A native plant is one that occurs naturally in a particular region, ecosystem, or habitat without direct or indirect human intervention. A single capsule may contain one or multiple seeds, either placed within a particular location inside the capsule or distributed throughout the medium contained within the capsule.

In nature, many seeds must go through a process of physiological preparation prior to germination. For example, seeds may go through a "period of dormancy" over the winter season during which the seed is exposed to cold and moisture. Other times, seeds may pass through the digestive tract of an animal, exposing the seed to acids and enzymes. Still other times seeds are exposed to extreme heat, as happens in the case of a wildfire. The natural preparation processes break down the seed coat, and are sometimes necessary in order for the seed to germinate. Accordingly, plant seeds may either be prepared thermally, chemically, mechanically, etc., prior to enclosing them within the container. Stratification and scarification are two artificial processes whereby seeds are treated, mimicking the natural process that prepare seeds for germination. In the former, seeds are artificially exposed to periods of cold and moisture, while in the latter, seed are mechanically scratched, nicked, or cut to break the seed coats. Other preparation processes, such as exposure to acids, enzymes, and other chemical treatments, may also be suitable for purposes of this disclosure.

Plant seeds may be bound or coated with a material such as soil, vermiculite, gel, fertilizer, or other nutrients before being placed within the container; or plant seeds may not be coated or bound to other materials. Plant seeds may either be predominantly dry or predominantly moist when they are placed within the container.

Plant seeds may come from different types of plants, and may derive from plants used for different purposes. For instance, plant seeds may come from the plants of grass, sedge, rush, forb, vine, shrub, tree, and cactus species, among others. Plants seeds may come from plants that are used as food crops, ornamental plants that are used for decorative purposes, or plants that are grown primarily for their ecological value. Further, plant seeds may come from plants that are generally adapted to grow in aquatic conditions, in saturated conditions, or in dry or terrestrial conditions.

In addition to plant seeds, the medium is also contained within the container. The medium comprises one or more particulate materials, one or more aqueous materials, or a combination of one or more particulate materials and aqueous materials. Particulate materials or aqueous materials may be mixed or otherwise combined to form a medium that is of a uniform consistency, they may be deposited within the container in layers, or some combination of both. Specific particulate materials or aqueous materials may serve one or multiple functions. Some functions are necessary for the basic functioning of the device, while others are optional.

One necessary function that at least one of the particulate or aqueous materials must serve is to ensure sufficient density of the device so that the device, in total, has a specific gravity greater than that of water and therefore will sink when placed in any type of water. Another function of at least one of the particulate or aqueous materials is to provide the means by which, upon contact with adequate moisture, the seed will become secured to the medium and the medium to the substrate on which the device is delivered. Depending on the selected medium, the medium can secure the seed or seeds to the substrate utilizing differing mechanisms.

Optional functions of the particulate or aqueous materials may include providing nutrition to the plant seeds and the plant that subsequently grows from the plant seeds, deterring animal herbivory or tampering with the device, and controlling other organisms that might detrimentally affect the health of the plant seeds or resulting plants. Aqueous materials may be included to act as a chemical buffering agent that prevent the container from dissolving from the inside due to exposure to the medium.

Particulate or aqueous materials also may be chosen because they help to create conditions that will result in seed germination, though it may not be necessary to artificially manipulate these conditions. For example, seed-to-soil contact is considered important for germination of the seeds of most plant species. This may prompt the use of soil as one of the particulate materials that make up the medium. However, the substrate upon which the device is delivered may supply the necessary seed-to-soil contact to prompt germination, and thus soil may not be one of the required particulate materials within the container.

Particulate materials such as crushed stone, sand, or the crushed shells of invertebrates are primarily added to the medium to add density to the device. Other inert or mildly reactive materials may be added as well for the same purpose. In some cases, these particulate materials may provide some nutritive benefit as well. Iron filings serve as one such example of a particulate material with these characteristics.

While particulate materials like compost or soil add some density to the device, they may be particularly beneficial because they may help to create the conditions necessary for germination, for example as a result of soil-to-soil contact, and because they provide nutrition to the plant once it germinates. Vermiculite may also be useful for germination and subsequent plant growth because it helps to retain air, nutrition, and moisture.

The addition of clay as a particulate material may serve multiple functions. Some clay varieties may provide some nutritional benefit to plants, as well as some density to the device. Some clays have qualities that may help to create conditions that are favorable for germination of the plant seed. For instance, bentonite clay absorbs water, causing it to swell, often to a size that is many times its volume when dry. This may allow a plant seed that is surrounded by clay particulate materials to be exposed to light once moisture is added and this swelling process results. Some clays have desirably tacky or adhesive-like qualities as well, helping to secure the plant seeds to the medium and the medium to the substrate. Bentonite clay is only one type of clay that may be used as part of the medium. There are numerous other types of clay that may serve as appropriate particulate materials to include in the medium as well.

Particulate and aqueous materials may also include one or more polymers of different types. Polymers may enhance the characteristics of the medium which cause the plant seeds to be secured to the medium and the medium, upon dissolution of the container, to be secured to the substrate. Polymers may also be chosen to address or control the amount of light that reaches the plant seed. Polymers may be natural or synthetic; opaque, transparent, or translucent. Polymers may also be biodegradable. Further information on natural polymers may be found in Kulkarni Vishakha, S., D. Butte Kishor, and S. Rathod Sudha. "Natural Polymers—A Comprehensive Review." International Journal of Research in Pharmaceutical and Biomedical Sciences ISSN: 2229-3701 (2012). Further information on adhesive polymers may be found in Roy, S., and Bala Prabhakar. "Bioadhesive polymeric platforms for transmucosal drug delivery systems—a review." Tropical Journal of Pharmaceutical Research 9.1 (2010).

Particulate or aqueous materials may also include fertilizers. Fertilizers provide nutrition for plant seeds and their resulting plants. Fertilizers may be natural or synthetic. The term fertilizer may include both macronutrients and micronutrients. Soil conditioners may also be utilized to enhance a plant's uptake of nutrients. Particulate materials may also include pesticides or fungicides.

Particulate or aqueous materials may also include agents that are intended to discourage herbivory or tampering with the device. These may include, by way of example, liquid, dried, or crystalized formulations of agents such as animal urine or similar scents, or agents that have a bitter or otherwise undesirable taste such as methyl anthranilate, a derivative of Concord grapes that is known to be effective at deterring birds.

Particulate materials may also include agents that help to retain moisture within the medium, particularly after the capsule has dissolved and the medium has absorbed moisture. Such agents may include polymers, organic or inorganic material, soils of different types, or any other material that serves this purpose.

Particulate materials may also include organisms that provide a valuable biological function for plant seeds or the resulting plants after germination, promoting healthy plant life. These may include microbes such as bacteria, fungi, viruses, or protozoa. Such amendments may serve to improve plant nutrition, stimulate plant hormone production, strengthen plant resistance to disease or drought, or otherwise enhance plant growth.

This disclosure also includes a method of delivering plant seeds to a substrate using a multitude of seed delivery devices in which are enclosed, within containers, one or more plant seeds and a medium comprising one or more particulate materials, one or more aqueous materials, or a combination of one or more particulate materials and aqueous materials, said multitude of delivery devices each having a specific gravity greater than that of water; and distributing said multitude of seed delivery devices to a substrate through manual or mechanical means. The term multitude here is meant to include one or many such devices, though typically numerous such devices would be delivered at a given time. In various embodiments, the container may, upon contact with water, dissolve, decompose, break apart, break down, disintegrate, disperse, hydrolyze, or at least achieve partial states thereof. Those of ordinary skill in the art with knowledge of this disclosure will recognize that the form of disassociation of the container, or combinations of the forms of disassociation, will be dependent upon the materials selected to form the container.

Figure 3:
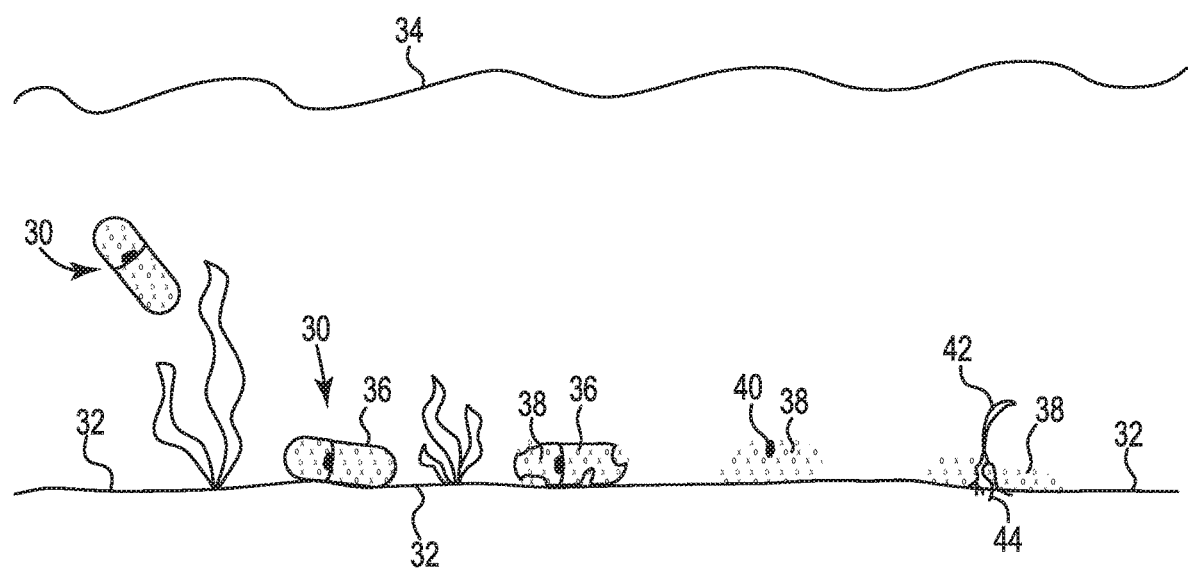
FIG. 3 is a series of images depicting an embodiment of the seed delivery device.

FIG. 3 illustrates a series of images depicting an embodiment of the seed delivery device 30 that has been delivered to an aquatic substrate 32. In the first image in the series going from left to right across FIG. 3, the seed delivery device 30 has just been delivered into the water 34 and is sinking through the water 34 towards the substrate 32. In the second image, the seed delivery device 30 has reached the substrate 32 and is resting on the substrate 32. The container 36 has not yet begun to dissolve, but rather remains fully intact. In the third image, the container 36 has been in contact with moisture long enough that it has begun to dissolve, bringing the medium 38 inside the container 36 into contact with moisture and causing the medium 38 to gradually become moist and tacky. In the fourth image, the container (no longer shown) has dissolved completely, and the medium 38 has consequently become sufficiently moist that the plant seed 40 is secured to the medium and the medium is secured to the substrate, holding the plant seed 40 in place on the substrate 32. In the fifth image, the plant seed 40 has germinated and the "leaves" (cotyledons) of the plant 42 are beginning to emerge from the medium 38, while the roots 44 of the plant 42 are beginning to grow into the substrate 32.

In one embodiment of the method, the devices are distributed to an aquatic or inundated substrate, in another to a moist or saturated substrate, and in a third to a dry or terrestrial substrate. An aquatic or inundated substrate is any substrate in which a standing water column exists, whether such water column is still, flowing, or subject to waves or tidal forces. Aquatic substrates are typically covered by water, while inundated substrates are covered in water temporarily, for example because of tidal influence or flooding following heavy rainfall or snow melt. A moist or saturated substrate is one in which the substrate is slightly wet or damp, or in which the substrate holds as much moisture as it can absorb. A dry substrate or terrestrial substrate is one that is generally lacking in surface moisture. Over time substrates may change along the continuum from dry to aquatic. Substrates may or may not be temporarily covered in snow or ice, either before or after delivery of the multitude of seed delivery devices. The delivery devices may also be distributed on top of snow or ice.

Figure 4:
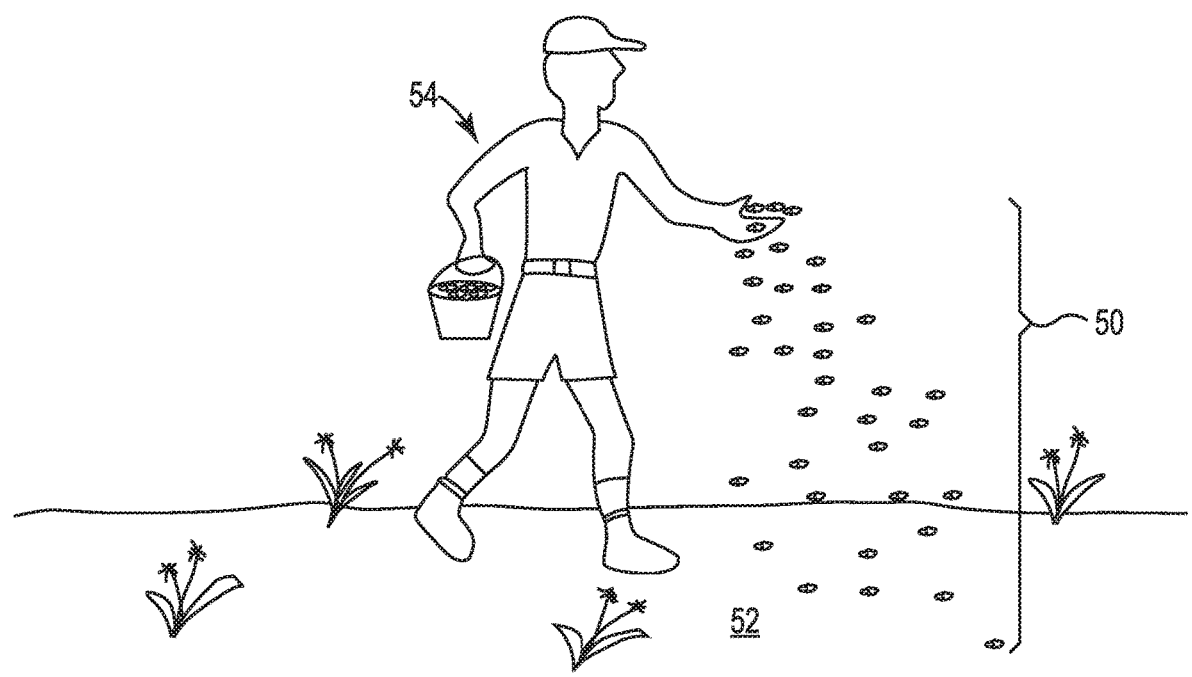
FIG. 4 depicts one method of distributing seed delivery devices.

Manual methods of distributing the seed delivery device to the substrate include those where the means of delivery are human powered, and especially those that are hand-held. These may include dropping, scattering, sprinkling, spreading, spraying, shooting, or otherwise disseminating the seed delivery devices using human hands or using tools that are transported and powered by a person. Some human-powered devices that are pushed or pulled may also be used to deliver seeds. FIG. 4 depicts a manual method of distribution of a multitude of the seed delivery devices 50 to a saturated substrate 52 upon which a person 54 broadcasts, scatters, or otherwise distributes the seed delivery devices 50 by hand.

Figure 5:
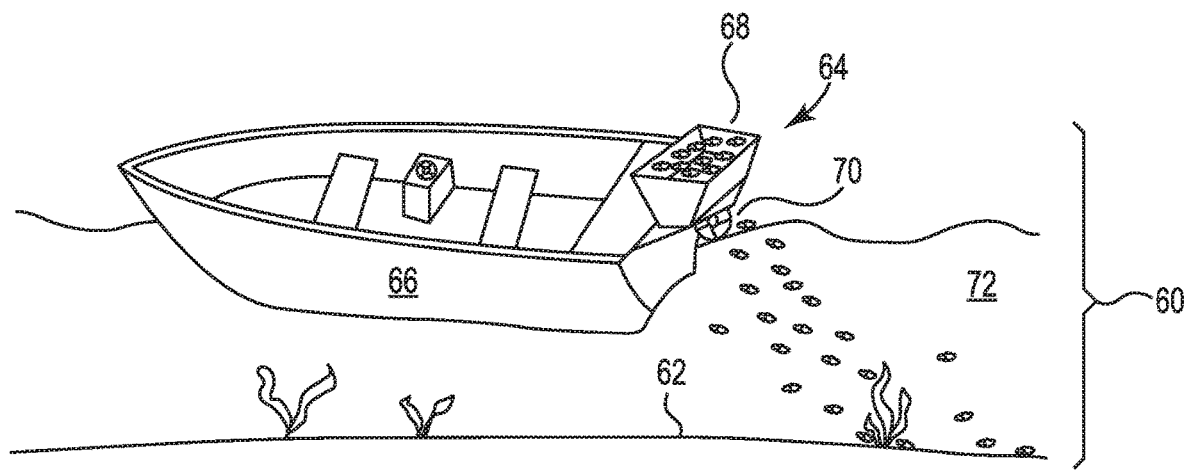
FIG. 5 depicts an alternative method of distributing seed delivery devices.

Mechanical methods of distributing the seed delivery devices include aircraft, watercraft, amphibious, or terrestrial vehicles from which the devices may be dropped, scattered, sprinkled, spread, sprayed, shot, or otherwise disseminated. FIG. 5 depicts a mechanical method of distribution of a plurality of the seed delivery devices 60 to an aquatic substrate 62 using a spreader device 64 attached to the back of a boat 66. The seed delivery devices 60 are placed into a hopper 68 at the top of the spreader device 64. The force of gravity gradually funnels the seed delivery devices to the bottom of the spreader device, where they fall onto a spinning disc 70 that spreads the seed delivery devices 60 into the water 72. Once they are in the water 72 the seed delivery devices 60 sink until reaching the substrate 62.

What is claimed is:

1. An article comprising a seed delivery device having:
   (a) a water dissolvable container having an internal space for holding materials, the water dissolvable container encapsulating materials placed in the internal space,
   (b) one or more plant seeds in the internal space of the water dissolvable container, and
   (c) a medium having one or more particulate materials, one or more aqueous materials, or a combination of the one or more particulate materials and the aqueous materials in the internal space of the water dissolvable container, wherein the medium comprises materials that are differentiable from the water dissolvable container and has a density sufficient to form a seed delivery device having a specific gravity greater than water,
   (d) wherein at least a portion of the water dissolvable container dissolves upon exposure to adequate water moisture and exposes the medium to water moisture to form a moistened medium,
   (e) wherein the moistened medium is comprised of materials that affix the one or more plant seeds to at least a portion of the moistened medium to form one or more particles, the one or more particles having a specific gravity greater than water, and (f) wherein the one or more plant seeds remain affixed to the one or more particles when the one or more particles are inundated or submerged in water and the water dissolvable container has dissolved completely.

2. An article according to claim 1, wherein the water dissolvable container, upon contact with water, decomposes, breaks apart, breaks down, disintegrates, disperses, hydrolyzes, at least partial states thereof or combinations thereof.

3. An article according to claim 1, wherein the water dissolvable container once exposed to adequate water moisture affixes both the one or more plant seeds to the medium and the medium to a substrate to enable germination of the one or more seeds.

4. An article according to claim 1, wherein the water dissolvable container comprises (i) a capsule made in two halves, one half having a smaller diameter body that is closed on one end, and the other half having a larger diameter cap that is also closed on one end that, wherein the two halves when joined seal the water dissolvable container, or (ii) a capsule made of one or more sheets that is sealed along a seam.

5. An article according to claim 1, wherein the water dissolvable container comprises a sealed pod, or a pouch.

6. An article according to claim 1, wherein the water dissolvable container is made from one or more of an aqueous solution of gelling agents, animal proteins, a polysaccharide, a derivative of a polysaccharide, or polyvinyl alcohol.

7. An article according to claim 1, further comprising anti-herbivory or anti-tampering compounds located within or upon the water dissolvable container.

8. An article according to claim 1, wherein the one or more plant seeds are coated.

9. An article according to claim 1, wherein the plant seed comprises an aquatic plant, a plant that grows in saturated conditions, a plant that grows in terrestrial conditions, a genetically modified plant, an ornamental plant, a crop plant, a plant grown for ecological purposes, a grass plant, a sedge plant, a rush plant, a forb plant, a vine plant, a shrub plant, a tree, or a cactus.

10. An article according to claim 1, wherein the medium comprises one or more of crushed stone, iron filings, sand, soil, vermiculite, compost, crushed shells of invertebrates, compost, soil, peat, vermiculite, clay, polymer, fertilizer, pesticide, fungicide, anti-herbivore compound, anti-tampering compound, chemical buffering agent, soil conditioner or combinations thereof.

11. An article according to claim 10, wherein the polymer comprises a natural material, a synthetic material, or a biodegradable material.

12. An article according to claim 1, wherein one or more of the particulate materials retains water moisture within the one or more particles.

13. An article according to claim 1, wherein the medium comprises organisms that provide a biological function for plant seeds or the resulting plants after germination, including one or more of bacteria, fungi, viruses, or protozoa.

14. A method comprising delivering a plurality of the seed delivery devices of claim 1 to a substrate to promote plant growth.

15. A method according to claim 14, wherein the substrate comprises an aquatic substrate, a moist or saturated substrate, or a dry or terrestrial substrate.

16. A method according to claim 14, wherein the plurality of seed delivery devices affix plant seeds to the medium and the medium to the substrate to enable germination of the one or more seeds.

17. A method according to claim 14, wherein the water dissolvable container of the seed delivery device comprises (i) a capsule made in two halves, one half having a smaller diameter body that is closed on one end, and the other half having a larger diameter cap that is also closed on one end that, wherein the two halves when joined seal the water dissolvable container, (ii) a capsule made of one or more sheets that is sealed along a seam, or (iii) a sealed pod, or a pouch.

18. A method according to claim 14, wherein delivering the plurality of seed delivery devices comprises manual distribution, mechanical distribution, hand casting, broadcasting, distribution by water craft, amphibious vehicle, terrestrial vehicle, or aircraft.

19. A method comprising:
(a) providing a water dissolvable container having an internal space for holding materials, the water dissolvable container encapsulating materials placed in the internal space,
(b) encapsulating (i) one or more plant seeds and (ii) a medium having one or more particulate materials, one or more aqueous materials, or a combination of the one or more particulate materials and the aqueous materials in the internal space of the water dissolvable container to form a seed delivery device, wherein the medium comprises materials that are differentiable from the water dissolvable container and has a density sufficient to form a seed delivery device with a specific gravity greater than water;
(c) exposing the water dissolvable container to water moisture such that it at least partially dissolves and exposes the medium to water moisture to form a moistened medium;
(d) wherein the moistened medium is comprised of materials that affix the one or more plant seeds to at least a portion of the moistened medium to form one or more particles, the one or more particles having a specific gravity greater than water; and
(e) wherein the one or more plant seeds remain affixed to the one or more particles when the one or more particles are inundated or submerged in water and the water dissolvable container has dissolved completely.

* * * * *